US009300597B2

(12) United States Patent
Manzella et al.

(10) Patent No.: US 9,300,597 B2
(45) Date of Patent: Mar. 29, 2016

(54) STATISTICS MODULE FOR NETWORK PROCESSORS IN VIRTUAL LOCAL AREA NETWORKS

(75) Inventors: Joseph A. Manzella, Macungie, PA (US); Michael T. Mangione, Point Pleasant, NJ (US); Nilesh S. Vora, Fogelsville, PA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 13/310,961

(22) Filed: Dec. 5, 2011

(65) Prior Publication Data

US 2012/0076153 A1   Mar. 29, 2012

Related U.S. Application Data

(63) Continuation-in-part of application No. 12/782,379, filed on May 18, 2010, now Pat. No. 9,081,742, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(51) Int. Cl.
*H04L 12/70* (2013.01)
*H04L 12/933* (2013.01)
*H04L 12/931* (2013.01)

(52) U.S. Cl.
CPC ............ *H04L 49/101* (2013.01); *H04L 49/109* (2013.01); *H04L 49/506* (2013.01)

(58) Field of Classification Search
CPC combination set(s) only.
See application file for complete search history.

(56) References Cited

U.S. PATENT DOCUMENTS

| 4,622,631 | A  | 11/1986 | Frank et al.     |
|-----------|----|---------|------------------|
| 5,623,698 | A  | 4/1997  | Stephenson et al.|
| 5,892,766 | A  | 4/1999  | Wicki et al.     |
| 5,943,283 | A  | 8/1999  | Wong et al.      |
| 6,038,630 | A  | 3/2000  | Foster et al.    |
| 6,195,335 | B1 | 2/2001  | Calvignac et al. |
| 6,233,246 | B1 | 5/2001  | Hareski et al.   |
| 6,567,564 | B1 | 5/2003  | van der Wal      |
| 6,636,932 | B1 | 10/2003 | Regev et al.     |

(Continued)

FOREIGN PATENT DOCUMENTS

JP   H02-271444   11/1990

OTHER PUBLICATIONS

Ryzhyk, Leonid. "The ARM Architecture." University of New South Wales. (2006).*

*Primary Examiner* — Chris Parry
*Assistant Examiner* — Caroline Jahnige
(74) *Attorney, Agent, or Firm* — Nicholson De Vos Webster & Elliott LLP (57) ABSTRACT

Described embodiments provide a method of operating a network processor coupled to a network via a communication link. An input/output adapter receives a data packet. A classification module provides control values of the data packet to a statistics module. The statistics module determines (i) updatable statistics based on the control values, and (ii) an address of a statistics bin in a memory of the network processor corresponding to the statistics. Updated values of the statistics are stored at the corresponding address. Values at selected addresses are processed by a control processor of the network processor, generating traffic characteristics for the data packets. The control processor adjusts operation of the network processor based on the traffic characteristics.

24 Claims, 5 Drawing Sheets

(56) References Cited

U.S. PATENT DOCUMENTS

| | | | |
|---|---|---|---|
| 6,658,012 B1 * | 12/2003 | Baucom et al. | 370/401 |
| 6,798,746 B1 * | 9/2004 | Kloth et al. | 370/235 |
| 7,089,346 B2 | 8/2006 | Cebulla et al. | |
| 7,234,018 B1 | 6/2007 | Purcell et al. | |
| 7,461,208 B1 | 12/2008 | Caprioli et al. | |
| 7,594,028 B1 | 9/2009 | Jacobs et al. | |
| 7,596,142 B1 | 9/2009 | MacAdam | |
| 7,738,454 B1 * | 6/2010 | Panwar et al. | 370/389 |
| 7,860,006 B1 * | 12/2010 | Kashyap et al. | 370/235 |
| 7,936,687 B1 * | 5/2011 | Parker et al. | 370/252 |
| 7,949,732 B1 * | 5/2011 | Roesch et al. | 709/220 |
| 2002/0029214 A1 | 3/2002 | Yianilos et al. | |
| 2002/0067296 A1 * | 6/2002 | Brown | 341/106 |
| 2002/0165985 A1 | 11/2002 | Chen et al. | |
| 2003/0033276 A1 | 2/2003 | Cheng et al. | |
| 2003/0115417 A1 | 6/2003 | Corrigan | |
| 2003/0123468 A1 | 7/2003 | Nong | |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2005/0201415 A1 * | 9/2005 | Narsinh et al. | 370/469 |
| 2005/0276230 A1 * | 12/2005 | Akahane et al. | 370/252 |
| 2006/0256783 A1 | 11/2006 | Ayrapetian et al. | |
| 2007/0016756 A1 | 1/2007 | Hsieh et al. | |
| 2007/0226798 A1 | 9/2007 | Sibert | |
| 2007/0271374 A1 * | 11/2007 | Shomura et al. | 709/224 |
| 2008/0162793 A1 | 7/2008 | Chu et al. | |
| 2008/0279185 A1 * | 11/2008 | Zhang et al. | 370/392 |
| 2010/0027436 A1 * | 2/2010 | Yamasaki | 370/252 |
| 2010/0074135 A1 * | 3/2010 | Pepper | 370/252 |
| 2010/0260198 A1 | 10/2010 | Rojas-Cessa et al. | |

* cited by examiner

STATISTICS MODULE FOR NETWORK PROCESSORS IN VIRTUAL LOCAL AREA NETWORKS

CROSS-REFERENCE TO RELATED APPLICATIONS

This application is a continuation-in-part, and claims the benefit of the filing date, of U.S. patent application Ser. No. 12/782,379 filed May 18, 2010 now U.S. Pat. No. 9,087,742, Ser. No. 12/782,393 filed May 18, 2010 now U.S. Pat. No. 8,255,644, and Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, and Ser. No. 13/274,726 filed Oct. 17, 2011, the teachings of which are incorporated herein in their entireties by reference.

BACKGROUND OF THE INVENTION

1. Field of the Invention

The present invention relates to communication systems, in particular, to statistics counters for packet networks, specifically Ethernet Virtual Local Area Networks (VLANs).

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators. Network processors implemented as a system on chip (SoC) having multiple processing modules might typically classify an incoming packet to determine which of the processing modules will perform operations for the particular packet or flow of packets.

A network might be expanded by using one or more repeaters, bridges, switches or similar type devices ("bridging devices") that might couple multiple similar networks and direct network traffic among the networks. Some bridging devices, such as multiple port bridges, switches, and routers, include the capability for a user to define one or more virtual local area networks (VLANs). VLANs enable separate address spaces to be associated with each VLAN. The user defines a VLAN by grouping one or more ports together in a VLAN definition, where the bridging device effectively separates each VLAN from the other network ports. The bridging device forwards traffic amongst ports which are members of the same VLAN.

A network processor in a bridging device might typically maintain one or more statistics for received and transmitted data packets to enable monitoring of a performance level of the bridge. Present statistics monitoring techniques described, for example, in the IEEE 802.1D and IEEE 802.1Q specifications, typically maintain separate counters for each port of the bridging device.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of operating a network processor coupled to a network via a communication link. An input/output (I/O) adapter receives a data packet that is one of (i) a receive data packet from the communication link and (ii) a transmit data packet from a processing module of the network processor. A classification module provides one or more control values of the data packet to a statistics module. The statistics module determines (i) one or more updatable statistics based on the control values, and (ii) an address of a statistics bin in a memory of the network processor corresponding to the updatable statistics. Updated values of the determined statistics are stored at the corresponding statistics bin address. Values at selected ones of the statistics bin addresses are periodically processed by a control processor of the network processor, generating traffic characteristics for packets from the communication link and the processing modules. The control processor adjusts operation of the network processor based on the traffic characteristics.

BRIEF DESCRIPTION OF THE DRAWING

Other aspects, features, and advantages of embodiments of the present invention will become more fully apparent from the following detailed description, the appended claims, and the accompanying drawings in which like reference numerals identify similar or identical elements.

DETAILED DESCRIPTION

Described embodiments of the present invention provide statistics counters to an input/output (I/O) interface of a multi-core, multi-threaded network processor in a packet-based network, such as Ethernet. A bank of counters might be available for allocation to any I/O port of the network processor. One or more statistics counters might be allocated to one (or shared by multiple) ports to maintain Ethernet and VLAN statistics. A counter might be allocated based on port direction, port number, VLAN priority, VLAN number, or any other allocation, on an as-needed basis. Some embodiments might employ a two-level remapping table to determine a selection of a corresponding counter.

Table 1 defines a list of acronyms employed throughout this specification as an aid to understanding the described embodiments of the present invention:

TABLE 1

| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| | | DRAM | Dynamic Random Access Memory |
| SAS | Serial Attached SCSI | | |
| PCI-E | Peripheral Component Interconnect Express | MPLS | Multi-Protocol Label Switching |
| SRIO | Serial RapidIO | CRC | Cyclic Redundancy Check |
| SoC | System-on-Chip | μP | Microprocessor |
| MMB | Memory Manager Block | MPP | Modular Packet Processor |
| PAB | Packet Assembly Block | MTM | Modular Traffic Manager |
| SPP | Security Protocol Processor | SED | Stream Editor |
| | | OSI | Open Systems Interconnection |
| VLAN | Virtual Local Area Network | SWD | Serial Wire Debug |
| JTAG | Joint Test Action Group | SPI | Serial Peripheral Interface |
| SLIP | Serial Line Internet Protocol | COS | Class of Service |
| UART | Universal Asynchronous Receiver/Transmitter | ACL | Access Control List |
| | | IP | Internet Protocol |
| UDP | User Datagram Protocol | | |
| TCP | Transmission Control Protocol | | |

Figure 1:
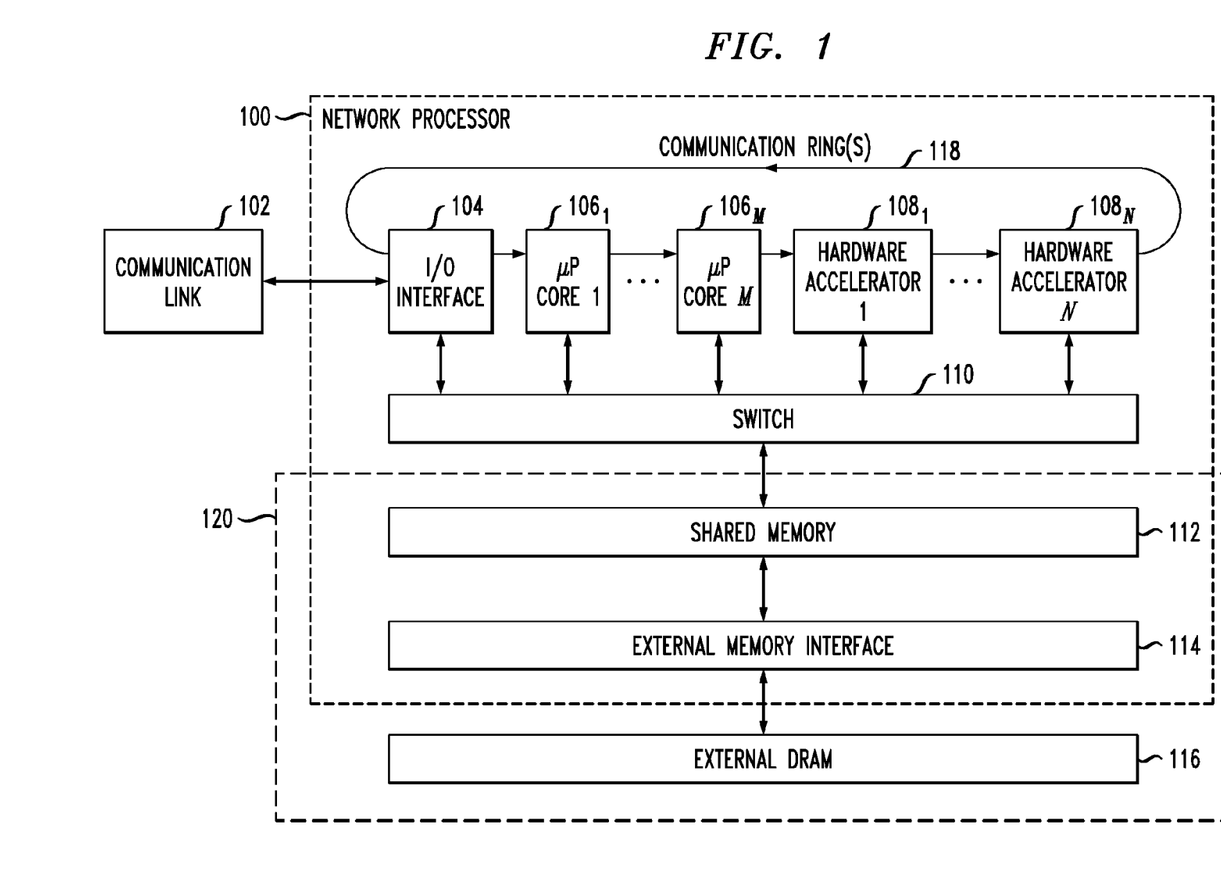
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. Nos. 7,439,652 and 7,899,904, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

Figure 2:
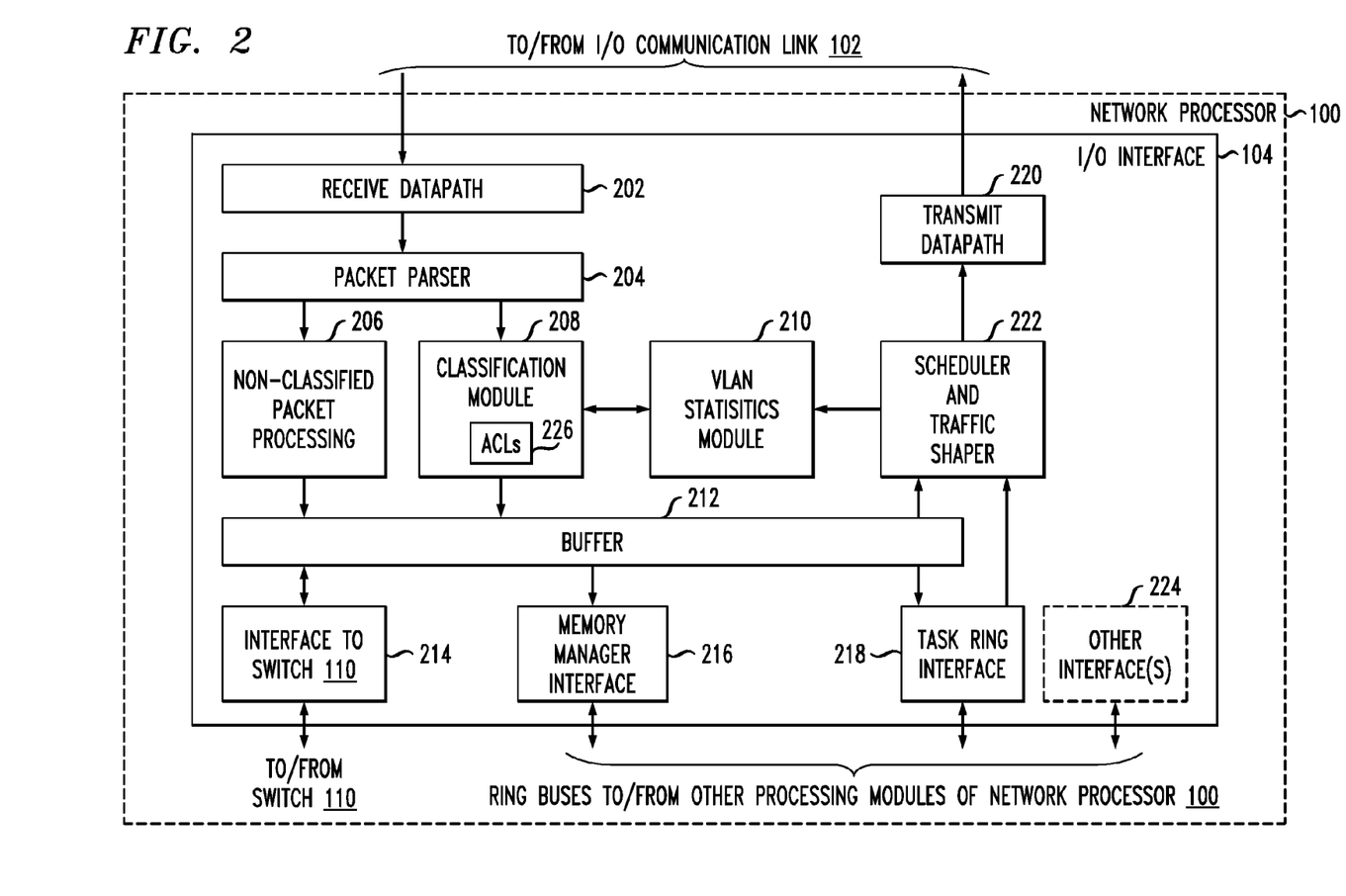
FIG. 2 shows a block diagram of an input/output interface of the network processor of FIG. 1, in accordance with exemplary embodiments of the present invention.

FIG. 2 shows a block diagram of I/O interface 104. As described herein, I/O communications link 102 might be at least one of a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces. In some embodiments, I/O communications link 102 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART) such as described in related U.S. patent application Ser. No. 13/274,726 filed Oct. 17, 2011. As shown in FIG. 2, I/O interface 104 might have interface with I/O communications link 102 via receive datapath 202 and transmit datapath 220. Receive datapath 202 provides data received from I/O communications link 102 to packet parser 204.

Packet parser 204 extracts various data fields from received packets. For example, packet parser 204 might extract OSI Layer 2, Layer 3 or Layer 4 fields from the received packet, such as MAC addresses, MPLS addresses, IP addresses, or TCP/UDP port addresses. Packet parser 204 might also perform some verification of the received packet, such as verifying a CRC value or IPv4 checksum, or verifying that the packet is properly formed. Depending on the extracted data, packet parser 204 might also perform special processing for a received packet. For example, packet parser 204 might detect Ethernet Synchronization Messaging Channel (ESMC) packets and provide them to a specialized data flow of network processor 100. Some specialized packets might be provided to non-classified packet processing module 206, which might generate and enqueue a task for processing within network processor 100 without further processing by I/O interface 104. For example, Ethernet "pause" packets, Ethernet "runt" packets, and ESMC packets might be provided to module 206.

Typical received packets might be provided to classification module 208. Classification module 208 might include one or more access control lists (ACLs) 226 and might perform bridging, policing, and correlation for received packets. For example, classification module 208 might be employed to determine, via ACLs 226 or one or more bridging lists (not shown), one or more destinations corresponding to a received packet. For example, some embodiments of the present invention might support MAC address bridging in accordance with IEEE 802.1D. Each ACL 226 might include one or more rules based on at least one of a VLAN corresponding to the packet and a port corresponding to the packet. Classification module 208 might also check rate limits for corresponding VLANs and ports.

After processing by either module 206 or classification module 208, received packet data might be stored in buffer 212 before being written, via interface 214, to system memory 120. One or more memory blocks in system memory 120 might be allocated to stored the received packet data based on a request sent to the MMB via memory manager interface 216. The one or more tasks generated corresponding to the received packet are provided to subsequent processing modules of network processor 100 via task ring interface 218. As shown in FIG. 2, I/O interface 104 might also have one or more additional communications interfaces (e.g., a clock signal, etc.) with various modules of network processor 100, shown as other interfaces 224.

I/O interface 104 receives tasks for transmission onto I/O communication link 102 via task ring interface 218. Task ring interface 218 provides (an address in system memory 120 of data to be transmitted) to scheduler and traffic shaper 222. Scheduler and traffic shaper 222 schedules packets for transmission by I/O interface 104 onto communication link 102. Scheduler and traffic shaper 222 might shape packet traffic based on per-port credits, where the credits are based on packet size. A data packet for transmission is provided to transmit datapath 220, which transmits the data packet to a destination via I/O communication link 102.

Figure 3:
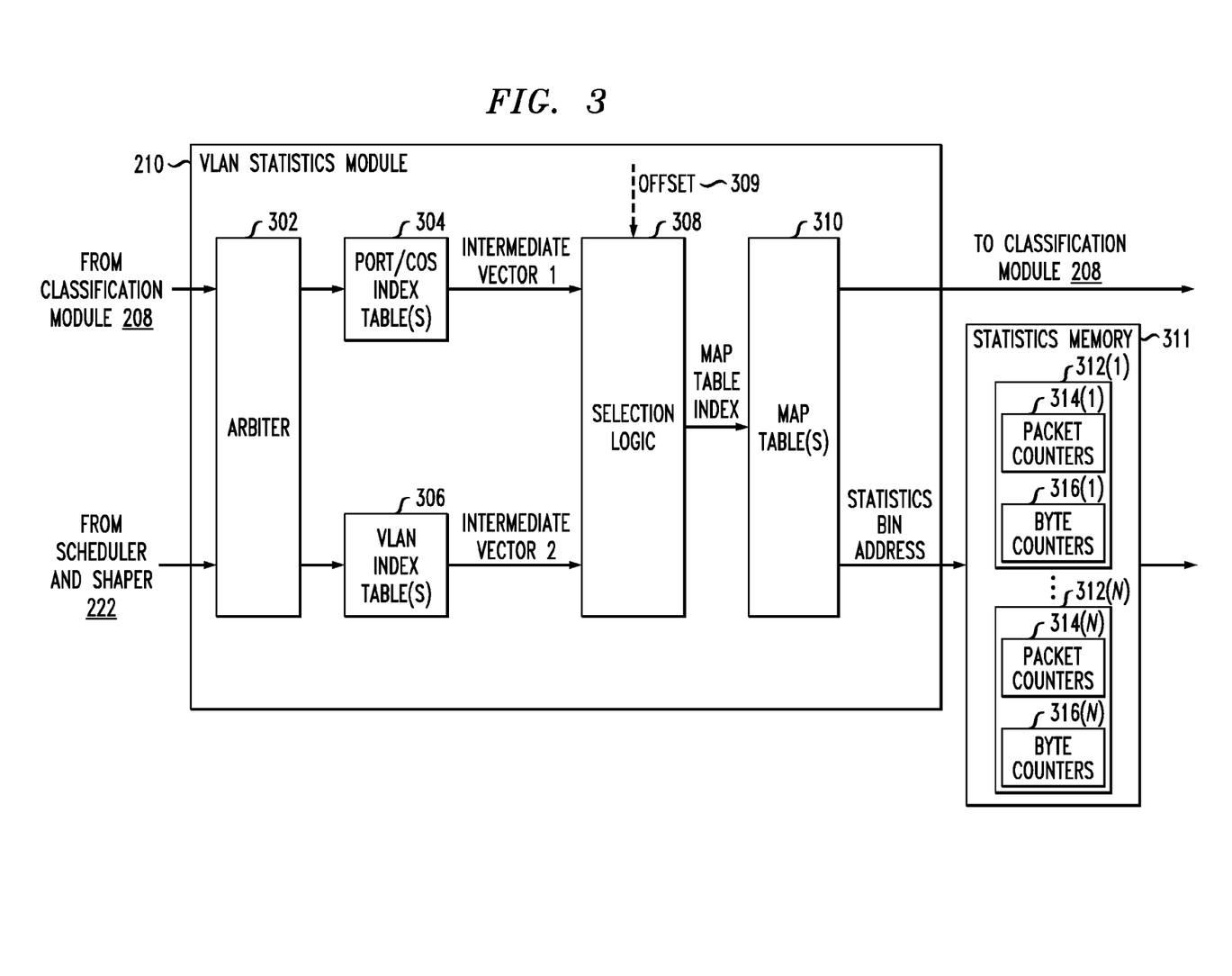
FIG. 3 shows a block diagram of a Virtual Local Area Network (VLAN) statistics module of the input/output interface of FIG. 2, in accordance with exemplary embodiments of the present invention.

VLAN statistics module 210 might maintain one or more statistics for various virtual local area networks of network processor 100. Such statistics might include a number of packets transmitted, a number of bytes transmitted, a number of packets received and a number of bytes received for each VLAN of network processor 100. As shown in FIG. 3, VLAN statistics module 210 includes arbiter 302 to arbitrate inputs from classification module 208 (e.g., corresponding to packets received by network processor 100) and scheduler and shaper 222 (e.g., corresponding to packets transmitted by network processor 100). Classification module 208 and scheduler and shaper 222 might provide data corresponding to each transmitted and received packet to VLAN statistics module 210, such as, for example, port numbers, VLAN 1D values, a priority value, and a number of packets and a number of bytes received (classification module 208) or transmitted (scheduler and shaper 222). A given packet might have one or more VLAN 1D values (e.g., an ingress VLAN 1D determined when a packet is received and corresponding to a source VLAN, and an egress VLAN ID determined before a packet is transmitted and corresponding to a destination VLAN). In some embodiments, the VLAN ID is extracted from a packet on ingress when the packet is received by network processor 100, and the VLAN ID value goes through a series of permutations as described herein before the VLAN ID value is presented to VLAN statistics module 210. On egress, before the packet is transmitted by network processor 100, the VLAN ID value is extracted from the packet (unless the packet does not have corresponding VLAN tag, in which case the VLAN ID value might be based on a value of a control register).

Arbiter 302 provides some of the statistics data (such as port numbers and priority) to Port and class of service (COS) index table(s) 304, and other statistics data (such as VLAN ID values) to VLAN index table(s) 306. Index tables 304 and 306 might map a given port and priority (table 304) or a given VLAN ID value (table 306) to a first index vector of a memory address of a statistics bin for storing corresponding statistics data. Described embodiments provide N bins in system memory 120 for storing statistics data. In some embodiments, N might be 1024. Each of tables 304 and 306 provide a portion of the corresponding first index vector to selection logic module 308. For example, Port/COS index table(s) 304 might provide an index vector based on the priority value and port number. In some embodiments, the index vector might be a 10-bit vector formed by concatenating the TxStat[0], Priority[5:0] and Port[3:0] fields of an Ethernet packet. VLAN index table(s) 306 might provide an index vector based on the VLAN ID value corresponding to the packet. In some embodiments, the index vector might be a 10-bit vector formed by truncating the 12-bit VLAN ID value.

Selection logic 308 selects corresponding bits of each index vector from tables 304 and 306 and provides an intermediate vector to map table(s) 310. As shown in FIG. 3, selection logic 308 might optionally receive an offset value to modify the given port and priority (table 304) or a given VLAN ID value (table 306) provided to selection logic 308 for mapping. Selection logic 308 is employed to generate the intermediate index vector based on the first index value from table 304 and the second index value from table 306. For example, in some embodiments, selection logic 308 receives the 10-bit index from port/COS index table 304 and the 10-bit index from VLAN index table(s) 306, and generates a 20-bit intermediate vector, for example by concatenating or interleaving the two 10-bit vectors.

Selection logic 308 might select a subset of the intermediate vector to generate an index to map table(s) 310. In some embodiments, selection logic 308 might select 12 contiguous bits of the intermediate vector based on offset value 309. The 12 selected bits are the index value of map table(s) 310 corresponding to the packet. In some embodiments, map table(s) 310 provide a 10-bit counter index corresponding to the 12-bit index value generated by selection logic 308. The index value corresponds to an address in statistics memory 311, which includes one or more statistics bins 312(1)-312(N). Each statistics bin 312 might include one or more counters, shown as byte counters 314(1)-314(N) and packet counters 316(1)-316(N). Map table(s) 310 might also provide one or more state indicators, such as an indicator corresponding to a value by which to increment corresponding counters of packet counters 314 and byte counters 316. Map table(s) 310 provide an address within statistics memory 311 (e.g., a statistics bin 312) corresponding to the packet. The address is provided to classification module 208, and might also be provided to statistics memory 311 to update the corresponding statistics bin 312 or provide data from the corresponding statistics bin to classification module 208.

Together, tables 304, 306 and 310 provide a two-level translation process to map statistics for a given packet into a statistics bin in system memory 120. The two levels of mapping allow statistics bins 312 to be allocated dynamically during operation of network processor 100. For example, dynamic allocation of statistics bins 312 might allow uneven allocation of bins between transmit statistics and receive statistics, allocation of bins by port number or VLAN ID, sharing (or not) of statistics bins between multiple VLAN IDs or port numbers, and allocation of bins based on packet parsing information. For example, statistics bins might be allocated based on the packet EtherType for Ethernet packets, or based on the IP protocol for IP packets, such that packets employing a given protocol (e.g., IPv4, IPv6, etc.) might share one or more statistics bins. In some embodiments, additional statistics might be tracked per packet, for example by employing multiple instances of the selection logic, map table and statistics memory, or by employing larger or additional decode tables 304, 306 and 310.

As described herein, for some embodiments, the first level of mapping is performed by Port/COS index table(s) 304 and VLAN index table(s) 306. Port/COS index table(s) 304 map a transmit status value (value is 1 for a transmit packet and 0 for a receive packet), a 6-bit packet priority value and a 4-bit port index to a 10-bit intermediate index. VLAN index table(s) 306 map a 12-bit VLAN ID value to 10-bit intermediate index. Selection logic 308 selects an arbitrary number of bits from the two 10-bit intermediate indices based on the value of offset 309. Some embodiments might select bits as shown in Table 2 below:

TABLE 2

| value of offset 309 [2:0] | Value of map table index [11:0] | |
|---|---|---|
| | Bits selected from Port/COS index table 304 [9:0] | Bits selected from VLAN index table 306 [9:0] |
| 0 | [1:0] | [9:0] |
| 1 | [2:0] | [9:1] |
| 2 | [3:0] | [9:2] |
| 3 | [4:0] | [9:3] |

TABLE 2-continued

| value of offset 309 [2:0] | Value of map table index [11:0] | |
|---|---|---|
| | Bits selected from Port/COS index table 304 [9:0] | Bits selected from VLAN index table 306 [9:0] |
| 4 | [5:0] | [9:4] |
| 5 | [6:0] | [9:5] |
| 6 | [7:0] | [9:6] |
| 7 | [8:0] | [9:7] |
| 8 | [9:0] | [9:8] |

Thus, as shown in Table 2, the value of offset 309 determines how many bits selection logic 308 selects from each of the intermediate vectors provided by port/COS index table 304 and VLAN index table 306. The resulting concatenation or interleaving of the bits (map table index [11:0]) is used as an index to map table 310 to determine a statistics bin 312 corresponding to the packet. In exemplary embodiments, bits selected from VLAN index table 306 are employed as the least significant bits in the concatenated value for the map table index.

Figure 4:
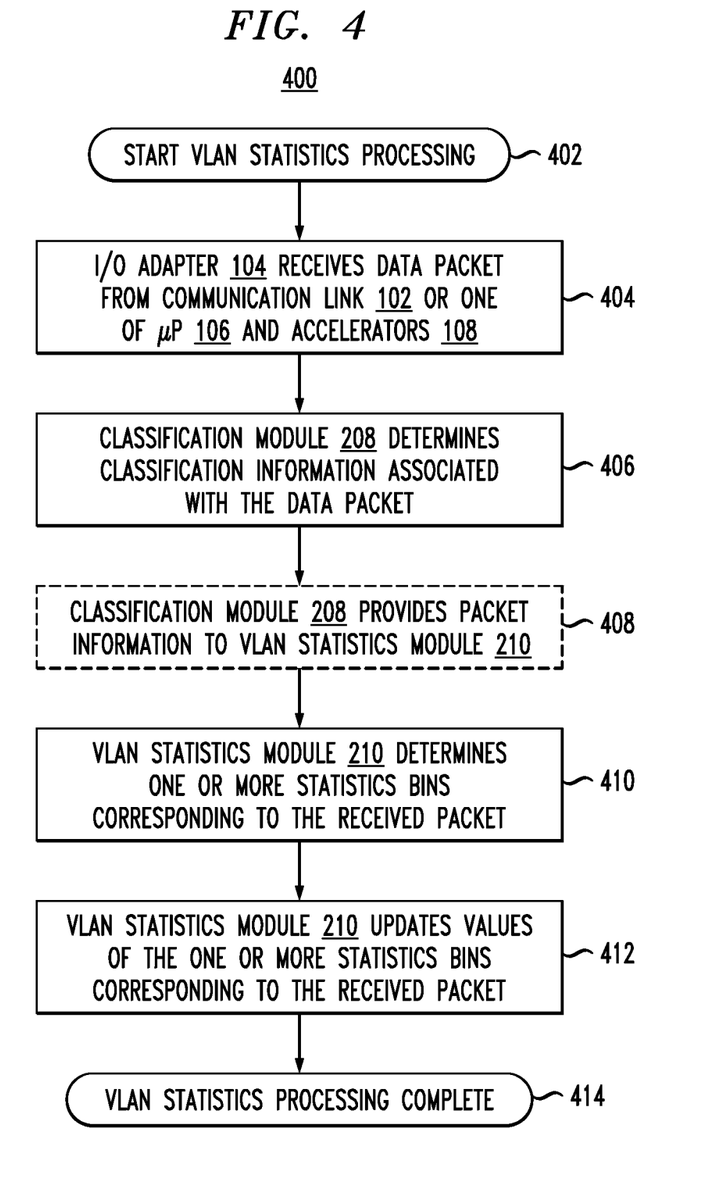
FIG. 4 shows a flow diagram of a statistics monitoring process of the VLAN statistics module of FIG. 3, in accordance with exemplary embodiments of the present invention.

FIG. 4 shows a flow diagram of exemplary VLAN statistics process 400. As shown in FIG. 4, at step 402, VLAN statistics process 400 starts. At step 404, I/O adapter 104 receives a data packet, either from communication link 102 (e.g., a receive packet), or from a processing module of network processor 100 (e.g., a transmit packet). Classification module 208 determines classification information associated with the data packet. As described herein, such classification information might include an indicator whether the packet is a receive packet or a transmit packet, a corresponding network port number, a corresponding VLAN ID value, a corresponding priority value, or other classification information, such as a corresponding network protocol. At step 408, classification module 208 provides the determined classification information to VLAN statistics module 210. As indicated by the dashed line, in some embodiments, step 408 might only occur for packets received from communication link 102, and might not be performed for packets transmitted by network processor 100.

At step 410, VLAN statistics module 210 determines one or more statistics bins 312 corresponding to the packet. As described herein, a given packet might be associated with a given statistics bin based on whether the packet is a receive or transmit packet, a VLAN ID value associated with the packet, one or more port numbers associated with the packet, a priority value associated with the packet, protocol information of the packet, or a combination thereof. Step 410 is described in greater detail in regard to FIG. 5. At step 412, VLAN statistics module 210 updates the statistics values stored in the determined statistics bin 312 associated with the packet. For example, VLAN statistics module 210 might update at least one of packet counter 314 and byte counter 316 of the corresponding statistics bin 312, with updated values corresponding to the packet received by I/O adapter 104. At step 414, VLAN statistics process 400 ends.

Figure 5:
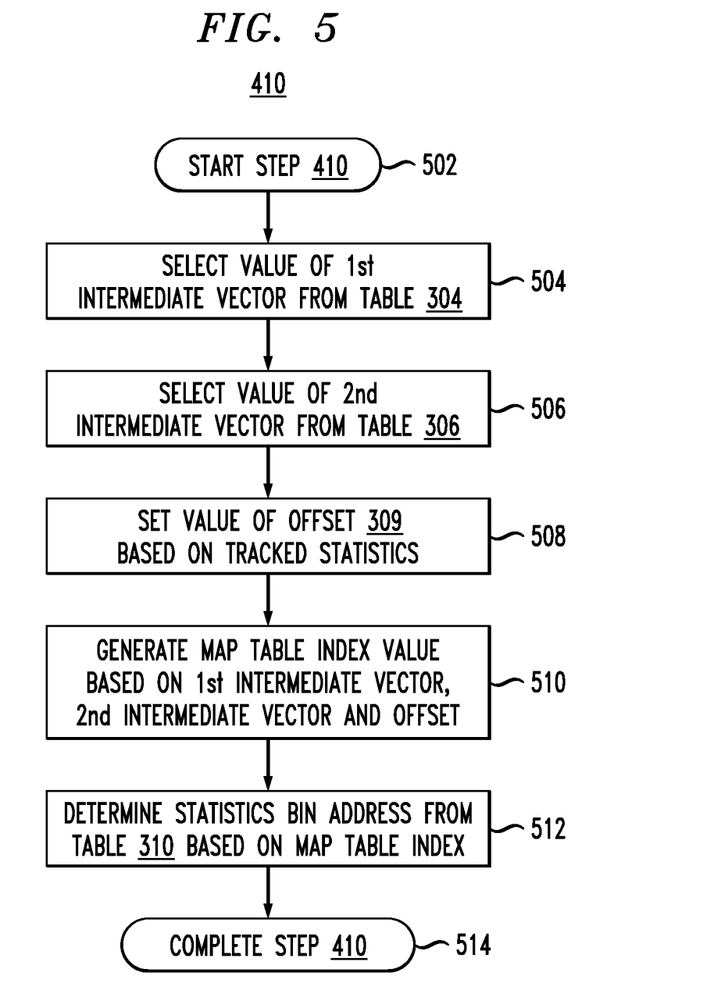
FIG. 5 shows a flow diagram of a statistics bin address determination subprocess of the statistics monitoring process of FIG. 4, in accordance with exemplary embodiments of the present invention.

FIG. 5 shows greater detail of an exemplary embodiment of step 410 of FIG. 4. As shown in FIG. 5, at step 502, subprocess 410 begins. At step 504, a first intermediate vector value is selected from Port/COS index table 304 and at step 506, a second intermediate vector value is selected from VLAN index table 306. At step 508, the value of offset 309 is set based on the type of statistics being maintained. For example, as described herein, an offset of 0 indicates that the port/COS are divided in to 4 types (2b) and the VLAN ID values are grouped into 1024 types (10b). Based on the value of offset 309, at step 510 selection logic 308 selects portions of the first intermediate vector and the second intermediate vector to form the map table index value. For example, selection logic 308 might function as described in regard to Table 2. At step 512, the address of the corresponding statistics bin and counters are determined from map table 310 based on the map table index value generated at step 510. At step 514, subprocess 410 ends.

The following exemplary cases show how address mapping might occur for several exemplary statistics cases: (1) maintaining receive and transmit statistics, (2) maintaining receive statistics, (3) maintaining port-based receive and transmit statistics, and (4) maintaining port and priority based receive and transmit statistics.

In the exemplary case where statistics bins 312 are employed only to provide receive and transmit VLAN statistics, offset value 309 might be equal to zero, such that, in the exemplary embodiment described by Table 2, ten bits are selected from VLAN index table 306 and two bits are selected from Port/COS index table 304 to form the 12-bit map index value. The two bits selected from Port/COS index table 304 are set such that bit 0 indicates whether the port corresponding to the packet is a receive port (bit set to 0) or a transmit port (bit set to 1), and bit 1 indicates whether the port corresponding to the packet is to be captured for statistics tracking (bit set to 0) or if the port is to be ignored (bit set to 1). Map table 310 is set such that 512 unique statistics bin addresses are supported. Selection logic 308 is set to generate map table indices such that VLAN ID values from zero to 511 (e.g., the first 512 VLAN IDs) are mapped to relative lower portions of respective counters 314 and 316 in each statistics bin 312, while VLAN values from 1024 to 2047 are mapped to relative upper portions of respective counters 314 and 316 in each statistics bin 312. Thus, each counter is shared between two VLAN ID values. VLAN IDs that not to be captured are mapped to a map table index of 512 (e.g., an invalid value) such that no counters are adjusted.

In the exemplary case where statistics bins 312 are employed only to provide receive statistics, offset value 309 might be equal to zero, such that, in the exemplary embodiment described by Table 2, ten bits are selected from VLAN index table 306 and two bits are selected from Port/COS index table 304 to form the 12-bit map index value. The two bits selected from Port/COS index table 304 are set such that bit 0 indicates whether the port corresponding to the packet is a receive port (bit set to 0) or a transmit port (bit set to 1), and bit 1 indicates whether the port corresponding to the packet is to be captured for statistics tracking (bit set to 0) or if the port is to be ignored (bit set to 1). Map table 310 is set such that 1024 unique statistics bin addresses are supported. Selection logic 308 is set to generate map table indices such that VLAN ID values from zero to 1023 (e.g., the first 1024 VLAN IDs) are mapped to respective counters 314 and 316 in each statistics bin 312, while VLAN values greater than 1023 are mapped to a map table index of 1024 (e.g., an invalid value) such that no counters are adjusted.

In the exemplary case where statistics bins 312 are employed to provide port-based receive and transmit statistics, offset value 309 might be equal to 2, such that, in the exemplary embodiment described by Table 2, eight bits are selected from VLAN index table 306 and four bits are selected from Port/COS index table 304 to form the 12-bit map index value. The four bits selected from Port/COS index table 304 are set such that bit 0 indicates whether the port corresponding to the packet is a receive port (bit set to 0) or a transmit port (bit set to 1), bits 1 and 2 are mapped from the actual port number to a logical port number, and bit 3 indicates whether the port corresponding to the packet is to be captured for statistics tracking (bit set to 0) or if the port is to be ignored (bit set to 1). In other words, each address in Port/COS index table 304 corresponds to a specific port/direction/priority combination. In described embodiments, up to 2048 combinations are supported. In exemplary embodiments, transmit packets are associated with bins 0-1023 and receive packets are associated with bins 1024-2047. Priority[0] is associated with bins 0-15 and 1024-1039, while Priority[1] is associated with bins 16-31 and 1040-1055, and so on. Port 0 is associated with bins 0, 16, 32, 48, and so on, while Port 1 is associated with bins 1, 17, 33, 49, and so on, as shown in Tables 2 and 3. Thus, each address location in Port/COS index table 304 table corresponds to a unique direction/priority/port combination.

Map table 310 is set such that 4096 VLAN IDs are mapped to 256 logical VLAN ID values. Selection logic 308 is set to generate map table indices such that receive packets for logical port 0 are mapped to statistics bins 0 through 255 and transmit packets for logical port 0 are mapped to statistics bins 256 through 511. For logical port 1, receive packets are mapped to statistics bins 512 through 767, while transmit packets might typically be ignored. For logical port 2, receive packets are mapped to statistics bins 768 through 831, while transmit packets are mapped to statistics bins 832 through 895. For logical port 4, receive packets might typically be ignored, while transmit packets are mapped to statistics bins 896 through 1023. Thus, map table 310 is configured in 256 chunks according to port number and packet transmission direction (RX/TX) as shown below in Table 3:

TABLE 3

| VLAN ID | Logical Port Number | Receive statistics bin | Transmit statistics bin |
|---|---|---|---|
| 0-255 | Port 0 | 0-255 | N/A |
| 256-511 | Port 0 | N/A | 256-511 |
| 512-767 | Port 1 | 512-767 | N/A |
| 768-1023 | Port 1 | N/A | not captured |
| 1024-1279 | Port 2 | 1st 64 to 768-831, rest are not captured | N/A |
| 1280-1535 | Port 2 | N/A | 1st 64 to 832-895, rest are not captured |
| 1536-1791 | Port 3 | not captured | N/A |
| 1792-2047 | Port 3 | N/A | 896-1023 |
| 2048 and up | N/A | not captured | not captured |

In the exemplary case where statistics bins 312 are employed to provide port and priority based receive and transmit statistics, offset value 309 might be equal to 8, such that, in the exemplary embodiment described by Table 2, two bits are selected from VLAN index table 306 and ten bits are selected from Port/COS index table 304 to form the 12-bit map index value. The ten bits selected from Port/COS index table 304 are set such that bit 9 indicates whether the port corresponding to the packet is a receive port (bit set to 0) or a transmit port (bit set to 1), bits 8 through 6 are mapped from the actual port number to a logical port number, and bits 5 through 0 are mapped from a priority value of the packet to a priority bin value. The two bits from VLAN index table 306 might be set to 0. Selection logic 308 is set to generate map table indices such that receive packets for logical port 0 are mapped to statistics bins 0 through 255, where each statistics bin is separated into 4 segments based on the priority value of the packet. Receive packets for logical port 1 are mapped to statistics bins 256 through 511, where each statistics bin is separated into 4 segments based on the priority value of the packet. For transmit packets, port 0 packets are mapped to statistics bins 2048 through 2303 and port 1 packets are mapped to statistics bins 2304 through 2559, where each statistics bin is separated into 4 segments based on the priority value of the packet. Thus, map table 310 is configured in 16 chunks according to port number and priority.

Thus, as described herein, embodiments of the present invention provide statistics counters to an input/output (I/O) interface of a multi-core, multi-threaded network processor in a packet-based network, such as Ethernet. A bank of counters might be available for allocation to any I/O port of the network processor. One or more statistics counters might be allocated to one (or shared by multiple) ports to maintain Ethernet and VLAN statistics. A counter might be allocated based on port direction, port number, VLAN priority, VLAN number, or any other allocation, on an as-needed basis. Some embodiments might employ a two-level remapping table to determine a selection of a corresponding counter.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention.

The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of operating a network processor, the network processor coupled to at least one network via a communication link, the method comprising:
- receiving, by an input/output (I/O) adapter of the network processor, a data packet;
- providing, by a classification module of the I/O adapter, one or more different types of control values associated with the data packet to a statistics module of the I/O adapter, wherein the one or more different types of control values comprise one or more of a network port number, a port direction, a network ID, a priority value, and a network protocol;
- determining, by the statistics module, one or more updateable statistics based on the one or more different types of control values associated with the data packet;
- determining, by the statistics module, an address of a statistics bin in at least one memory of the network processor to store the one or more updateable statistics based on a map table index vector that is generated using a multi-level mapping process which dynamically maps the updateable statistics to a statistics bin corresponding to the one or more updatable statistics for the data packet, wherein the multi-level mapping process comprises:
  - selecting a first intermediate index vector from a first index table based on at least one control value of a first type associated with the data packet,
  - selecting a second intermediate index vector from a second index table based on at least one control value of a second type associated with the data packet,
  - concatenating at least a portion of the first intermediate index vector and at least a portion of the second intermediate index vector to generate the map table index vector, and
- applying the map table index vector to a map table to determine an address of the statistics bin corresponding to the one or more updatable statistics for the packet;
- storing updated values of the one or more determined updatable statistics at the corresponding statistics bin address;
- periodically processing values at selected ones of the statistics bin addresses, thereby generating traffic characteristics for a plurality of data packets; and
- adjusting, by a control processor of the network processor, operation of the network processor based on the traffic characteristics.

2. The method of claim 1, wherein:
- the data packet is one of (i) a receive data packet from the communication link and (ii) a transmit data packet from one of a plurality of processing modules of the network processor,
- wherein if the data packet is a receive data packet, then storing the data packet in the at least one memory; generating one or more tasks corresponding to the stored data packet; and providing the tasks to one or more of the plurality of processing modules for processing by the network processor; and
- wherein if the data packet is a transmit data packet, then transmitting the data packet via the communication link.

3. The method of claim 2, wherein if the data packet is a transmit data packet, then further comprising:
- determining one or more destinations for each transmit data packet based on one or more access control lists of the classification module.

4. The method of claim 1, wherein the step of providing, by a classification module of the I/O adapter, one or more different types of control values associated with the data packet to a statistics module of the I/O adapter further comprises:
- extracting one or more data fields from the data packet, the one or more data fields comprising at least one of Open Systems Interconnection (OSI) Layer 2, Layer 3 and Layer 4 data fields.

5. The method of claim 4, wherein the one or more data fields comprise one or more of: a Media Access Control (MAC) address, a Multi-Protocol Label Switching (MPLS) address, an Internet Protocol (IP) address, a Transmission Control Protocol (TCP) port address and a User Datagram Protocol (UDP) port address.

6. The method of claim 4, wherein the one or more data fields comprise one or more of: a Virtual Local Area Network (VLAN) ID value, a priority value, and a number of bytes corresponding to the data packet.

7. The method of claim 1,
- wherein the first index table maps combinations of one or more of a network port number, a port direction, and a priority value to unique multi-bit first intermediate index vectors;
- wherein the second index table maps network IDs to unique multi-bit second intermediate index vectors;
- wherein selecting the first intermediate index vector from the first index table based on at least one control value of a first type associated with the data packet comprises selecting a multi-bit first intermediate index vector from the first index table based on a combination of one or more of a network port number, a port direction, and a priority value associated with the data packet; and
- wherein selecting the second intermediate index vector from the second index table based on at least one control value of a second type associated with the data packet comprises selecting a multi-bit second intermediate index vector from the second index table based a network ID associated with the data packet.

8. The method of claim 7,
- wherein the first intermediate index vector comprises a 10-bit vector which maps to a TxStat field, a Priority field and a Port field of the data packet;
- wherein the second intermediate index vector comprises a 10-bit vector which maps to at least a portion of a 12-bit VLAN ID value of the data packet; and
- wherein combining at least a portion of the first intermediate index vector and at least a portion of the second intermediate index vector to generate the map table index vector comprises:
  - setting, by a control processor of the network processor, a control offset value corresponding to the received data packet;
  - selecting zero or more bits from the first intermediate index vector and zero or more bits from the second intermediate index vector based on the control offset value; and
  - generating the map table index vector by one of concatenating and interleaving the selected bits from each of the first intermediate index vector and the second intermediate index vector.

9. The method of claim 8, further comprising:
- allocating a statistics bin corresponding to the data packet, wherein the allocation is based on the map table index vector which maps one or more data packets to each statistics bin, and wherein the allocation is based on a weighted combination of transmit and receive data packets, port number, VLAN ID value, and packet parsing data, wherein the weighted combination is based on the generated map table index vector.

10. The method of claim 9, wherein the packet parsing data comprises a packet EtherType for Ethernet packets and an IP protocol for IP packets.

11. The method of claim 1, wherein combining at least a portion of the first intermediate index vector and at least a portion of the second intermediate index vector to generate the map table index vector comprises:

setting an offset control value based on the one or more updatable statistics being determined by the statistics module; and selecting the portions of the first and second intermediate index vectors to be combined based on the offset control value.

12. The method of claim 1, wherein the one or more updatable statistics comprise, for each statistics bin, at least one of: a number of packets transmitted, a number of bytes transmitted, a number of packets received, a number of bytes received, one or more types of packets transmitted, one or more types of packets received, one or more priorities of packets transmitted, one or more priorities of packets received, one or more destination addresses of packets transmitted and one or more source addresses of packets received.

13. A non-transitory machine-readable medium, having encoded thereon program code, wherein, when the program code is executed by a machine, the machine implements a method of operating a network processor, the network processor coupled to at least one network via a communication link, the method comprising:

receiving, by an input/output (I/O) adapter of the network processor, a data packet;

providing, by a classification module of the I/O adapter, one or more different types of control values associated with the data packet to a statistics module of the I/O adapter, wherein the one or more different types of control values comprise one or more of a network port number, a port direction, a network ID, a priority value, and a network protocol;

determining, by the statistics module, one or more updatable statistics based on the one or more different types of control values associated with the data packet;

determining, by the statistics module, an address of a statistics bin in at least one memory of the network processor to store the one or more updatable statistics based on a map table index vector that is generated using a multi-level mapping process which dynamically maps the updatable statistics to a statistics bin corresponding to the one or more updatable statistics for the data packet, wherein the multi-level mapping process comprises:

selecting a first intermediate index vector from a first index table based on at least one value of a first type associated with the data packet, selecting a second intermediate index vector from a second index table based on at least one control value of a second type associated with the data packet, concatenating at least a portion of the first intermediate index vector and at least a portion of the second intermediate index vector to generate the map table index vector, and applying the map table index vector to a map table to determine an address of the statistics bin corresponding to the one or more updatable statistics for the packet;

storing updated values of the one or more determined updatable statistics at the corresponding statistics bin address;

periodically processing values at selected ones of the statistics bin addresses, thereby generating traffic characteristics for a plurality of data packets; and adjusting, by a control processor of the network processor, operation of the network processor based on the traffic characteristics.

14. The non-transitory machine-readable medium of claim 13, wherein the step of providing, by a classification module of the I/O adapter, one or more different types of control values associated with the data packet to a statistics module of the I/O adapter further comprises:

extracting one or more data fields from the data packet, the one or more data fields comprising at least one of Open Systems Interconnection (OSI) Layer 2, Layer 3 and Layer 4 data fields, wherein the one or more data fields comprise one or more of a Media Access Control (MAC) address, a Multi-Protocol Label Switching (MPLS) address, an Internet Protocol (IP) address, a Transmission Control Protocol (TCP) port address, a User Datagram Protocol (UDP) port address, a Virtual Local Area Network (VLAN) ID value, a priority value, and a number of bytes corresponding to the data packet.

15. The non-transitory machine-readable medium of claim 13, wherein the first index table maps combinations of one or more of a network port number, a port direction, and a priority value to unique multi-bit first intermediate index vectors;

wherein selecting the first intermediate index vector from the first index table based on at least one control value of a first type associated with the data packet comprises selecting a multi-bit first intermediate index vector from the first index table based on a combination of one or more of a network port number, a port direction, and a priority value associated with the data packet; and wherein selecting the second intermediate index vector from the second index table based on at least one control value of a second type associated with the data packet comprises selecting a multi-bi second intermediate index vector from the second index table based on network ID associated with the data packet.

16. The non-transitory machine-readable medium of claim 15, wherein the first intermediate index vector comprises a 10-bit vector which maps to a TxStat field, a Priority field and a Port field of the data packet;

wherein the second intermediate index vector comprises a 10-bit vector which maps to at least a portion of a 12-bit VLAN ID value of the data packet; and wherein combining at least a portion of the first intermediate index vector and at least a portion of the second intermediate index vector to generate the map table index vector comprises:

setting, by a control processor of the network processor, a control offset value corresponding to the received data packet;

selecting zero or more bits from the first intermediate index vector and zero or more bits from the second intermediate index vector based on the control offset value; and generating the map table index vector by one of concatenating and interleaving the selected bits from each of the first intermediate index vector and the second intermediate index vector.

17. The non-transitory machine-readable medium of claim 13, wherein combining at least a portion of the first intermediate index vector and at least a portion of the second intermediate index vector to generate the map table index vector comprises:

setting an offset control value based on the one or more updatable statistics being determined by the statistics module; and selecting the portions of the first and second intermediate index vectors to be combined based on the offset control value.

18. A network processor coupled to at least one network via a communication link, the network processor comprising:

an input/output (I/O) adapter configured to receive a data packet, wherein the data packet is one of (i) a receive data packet from the communication link and (ii) a transmit data packet from one of a plurality of processing modules of the network processor;

a classification module of the I/O adapter configured to provide one or more different types of control values associated with the data packet to a statistics module of the I/O adapter, wherein the one or more different types of control values comprise one or more of a network port number, a port direction, a network ID, a priority value, and a network protocol, wherein the statistics module is configured to:

(i) determine one or more updatable statistics based on the one or more different types of control values associated with the data packet, (ii) determine an address of a statistics bin in at least one memory of the network processor, to store the one or more updatable statistics based on a map table index vector that is generated using a multi-level mapping process which dynamically maps the updatable statistics to a statistics bin corresponding to the one or more updatable statistics for the data packet, wherein the multi-level mapping process comprises:

selecting a first intermediate index vector from a first index table based on at least one control value of a first type associated with the data packet, selecting a second intermediate index vector from a second index table based on at least one control value of a second type associated with the data packet, concatenating at least a portion of the first intermediate index vector and at least a portion of the second intermediate index vector to generate the map table index vector, and applying the map table index vector to a map table to determine an address of the statistics bin corresponding to the one or more updatable statistics for the packet, and (iii) store updated values of the one or more determined updatable statistics at the corresponding statistics bin address; and a control processor configured to (i) periodically process values at selected ones of the statistics bin addresses, thereby generating traffic characteristics for a plurality of data packets received from the communication link and the plurality of processing modules and (ii) adjust operation of the network processor based on the traffic characteristics.

19. The network processor of claim 18, wherein the classification module is further configured to:

extract one or more data fields from the data packet, the one or more data fields comprising at least one of Open Systems Interconnection (OSI) Layer 2, Layer 3 and Layer 4 data fields, wherein the one or more data fields comprise one or more of a Media Access Control (MAC) address, a Multi-Protocol Label Switching (MPLS) address, an Internet Protocol (IP) address, a Transmission Control Protocol (TCP) port address, a User Datagram Protocol (UDP) port address, a Virtual Local Area Network (VLAN) ID value, a priority value, and a number of bytes corresponding to the data packet.

20. The network processor of claim 18, wherein the first index table maps combinations of one or more of a network port number, a portion direction, and a priority value to unique multi-bit first intermediate index vectors;

wherein the second index table maps network IDs to unique multi-bit second intermediate index vectors;

wherein selecting the first intermediate index vector from the first index table based on at least one control value of a first type associated with the data packet comprises selecting a multi-bit first intermediate index vector from the first index table based on a combination of one or more of a network port number, a portion direction, and a priority value associated with the data packet; and wherein selecting the second intermediate index vector from the second index table based on at least one control value of a second type associated with the data packet comprises selecting a multi-bit second intermediate index vector from the second index table based a network ID associated with the data packet.

21. The network processor of claim 20, wherein:

the first intermediate index vector comprises a 10-bit vector which maps to a TxStat field, a Priority field and a Port field of the data packet;

wherein the second intermediate index vector comprises a 10-bit vector which maps to at least a portion of a 12-bit VLAN ID value of the data packet;

a control processor of the network processor is configured to set a control offset value corresponding to the received data packet; and wherein combining at least a portion of the first intermediate index vector and at least a portion of the second intermediate index vector to generate the map table index vector comprises:

selecting zero or more bits from the first intermediate index vector and zero or more bits from the second intermediate index vector based on the control offset value; and generating the map table index vector by one of concatenating and interleaving the selected bits from each of the first intermediate index vector and the second intermediate index vector.

22. The network processor of claim 18, wherein combining at least a portion of the first intermediate index vector and at least a portion of the second intermediate index vector to generate the map table index vector comprises:

setting an offset control value based on the one or more updatable statistics being determined by the statistics module; and selecting the portions of the first and second intermediate index vectors to be combined based on the offset control value.

23. The network processor of claim 18, wherein:

the communication link comprises at least one of a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, and a Serial Rapid I/O ("SRIO") link; and the one or more one or more processing modules comprise at least one of: control processors comprising Reduced Instruction Set Computing (RISC) central processing units (CPUs) and hardware accelerators and the at least one memory comprises a DRAM.

24. The network processor of claim 18, wherein the network processor is implemented as an integrated circuit chip.

* * * * *